Oct. 29, 1946.  A. J. HOLMAN  2,410,069
OBJECTIVE FOR PROJECTION, PHOTOGRAPHY, TELEVISION, AND FOR TELESCOPE
Filed Oct. 30, 1940

INVENTOR =
Arthur J. Holman.

Patented Oct. 29, 1946

2,410,069

UNITED STATES PATENT OFFICE 2,410,069

OBJECTIVE FOR PROJECTION, PHOTOGRAPHY, TELEVISION, AND FOR TELESCOPE

Arthur J. Holman, East Orange, N. J.

Application October 30, 1940, Serial No. 363,463

4 Claims. (Cl. 88—57)

My invention relates primarily to that type of projecting apparatus, or camera, wherein the film strip is moved continuously across the optical axis and the effect of this movement is so compensated by means of moving optical rectifying elements as to produce a stationary image. It has been the special object of my invention to provide a proper stationary element to function with the single rotating lens wheel having a plurality of identical rectifying elements disposed symmetrically about its periphery as fully described in Letters Patent of the United States No. 1,957,457 of May 8, 1934. My improved objective is essential to the realization of the best performance from the single revolving lens wheel rectifying system. Due to the distinctive features of its design, the characteristics of my objective are such that it is suited admirably for use as a telescope objective. It also may be used to advantage, either singly or in pairs, as an objective in photography and for television.

The distinctive features of my present design are twofold: first, the relative curvatures of the refracting surfaces are determined by an optical symmetry with respect to a radius and a point on the optical axis outside of the objective; second, the relative thicknesses of the elements are determined by an optical symmetry with respect to a point on the optical axis within the objective. The focal length is the principal factor in determining the location of the first point on the optical axis and the curvatures of the refracting surfaces determine the position of the second point. Given the focal length and diameter, or the $f$ value, of a proposed objective, and the optical constants of the glasses to be employed, it is a very simple matter to design my improved objective. The method of calculation hereinafter disclosed for designing an objective free from the errors and design faults usually recognized in optical computations, is the most elementary on record, and both the method of calculation and the lens design resulting therefrom are novel and most useful. My improved objective comprises elements with spherical refracting surfaces and its manufacture presents no new or difficult problems to the lens maker.

The process of designing a modern high speed photographic or projection objective, as now practiced quite generally by skilled technicians, presents a very difficult and tedious task, particularly if the designer has no accurate performance record from a former lens design which approaches closely the specifications to be met by the new design. To really fabricate a completely new and original design requires consummate skill on the part of the designer. The reason why this is true is quite simple: prior to applicant's discovery of the procedure hereinafter disclosed, there has never been any practical method for setting up a multiple element lens design by direct mathematical procedure. In present design practice the designer's mathematical facilities have only provided means for estimating the performance of a proposed lens element assembly after the curvatures and spacings of the refracting surfaces have been set up. Heretofore the initial setting up of the optical system has been based entirely on the experience and judgment of the chief designer.

In current practice this preliminary design is then turned over to the computing staff for ray tracing trigonometrically; a process which, if done accurately and thoroughly, may consume several man years of effort. These computations yield definite and accurate data on spherical aberration, sine condition, achromatism, astigmatism of oblique ray bundles and other valuable information concerning the probable performance of the optical system. Generally the initial setup is not good enough to meet the required lens performance and the chief designer, perhaps with the assistance of his staff, determines what modifications should be made in the initial lens setup to provide better performance. Again the computing staff analyzes the system trigonometrically and again the chief designer examines the data and estimates how the lens will probably perform if it is actually constructed. This procedure may go on through several setup modifications until the chief designer is satisfied that the performance of the lens will be sufficiently good to warrant building a sample. After the sample is actually constructed as close to specifications as is humanly possible, it is more often than not, found to be unsatisfactory in performance and further computing is required to determine which refracting surface or surfaces should be changed in curvature or spacing or both to provide better performance from the lens system. Current commercial practice in lens design requires genius in the chief designer or inexhaustible patience in employing "cut and try" methods plus very extensive experience in the art of lens design.

The primary characteristic of the design method herein disclosed, and also of the product so designed, is this; the optical system, whether it be for projection, photography, television or for a telescope, is integrated and built up from scratch as an original design about two cardinal points of the system, namely the optical center, or nodal point, and the point of principal focus. The design is defined entirely and completely by (1) the refracting power required, (2) the particular achromatism desired, (3) the optical characteristics of the glasses employed, and finally by (4) the radius R to which the system is bent. The swinging end of radius R passes through the optical center or nodal point of the system and the pivoting end of radius R is centered on the optical axis of the systm at a point closely related to and determined primarily by the point of principal focus. In all lens systems designed in this manner, the ratios of the radii of curvature of the refracting surfaces are determined finally by the radius R to which the system is bent and the spacing of each refracting surface within the system is determined completely and finally by the radius of curvature of each particular refracting surface in the system. The mathematics employed is adequate to produce a final design on the first trial: nothing is left to speculation or guess work; no ray tracing trigonometric check is required because the optical system has been set up mathematically correct. The design procedure is direct and the lens structure resulting from this design procedure is really new and differs fundamentally from lens structures arrived at by the "cut and try" methods now generally employed.

My device may be best understood by reference to the accompanying drawing in which Fig. 1 is an elementary elevation of an optical rectifying system showing rectifying elements carried by a rotating lens wheel, the stationary front component of the objective system and a section of the aperture unit and the film strip thereon.

Figure 1:
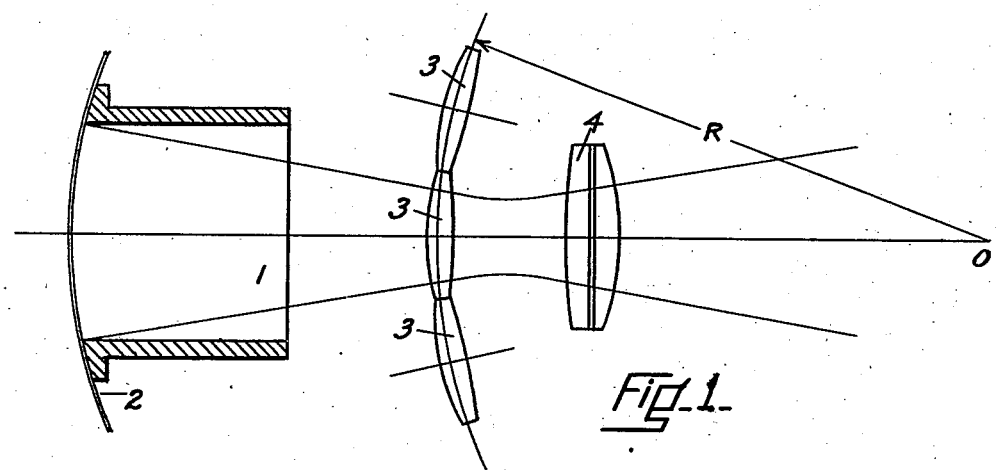

Referring now more specifically to the drawing, in which like reference numerals indicate like parts, 1 (Fig. 1) is the projector or camera aperture unit, 2 is the film strip suitably supported thereon and arranged to be operated at uniform velocity thereover, 3 indicates optical elements (three shown) carried by the revolving lens wheel and having their optical centers on a common circle described at radius R from the center O of the lens wheel and 4 is the stationary component which is commonly described as the front component of the objective system. The elements 3, are carried across the optical axis by rotation of the lens wheel, each in turn becoming the rear component of the objective system and, when coacting with stationary front component 4, completing the optical rectifying objective. Complete data concerning the revolving lens wheel structures are disclosed in Letters Patent No. 1,957,457 hereinabove referred to, and reference thereto is hereby made in lieu of further description of the revolving structures. The present application for Letters Patent is concerned primarily with design features of the fixed front component 4 and the combination of such component with the revolving lens wheel to form a complete and new optical rectifying objective.

Figure 2:
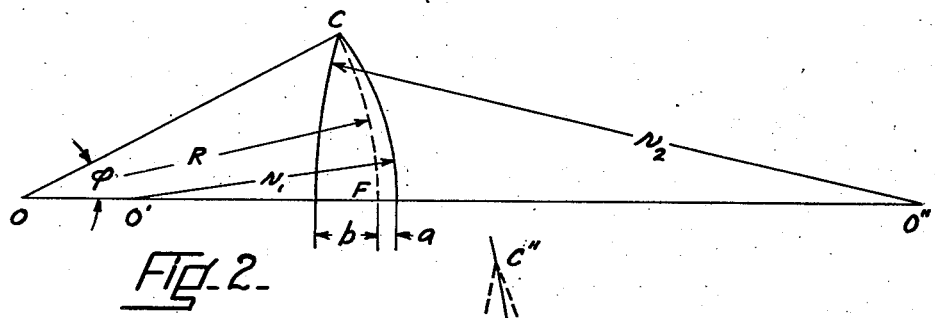
Fig. 2 is a geometrical figure from which data is obtained for calculating the relative curvatures of the refracting surfaces of the lens wheel elements, also the curvatures of the elements of the stationary front component.

The values of $r_1$ and $r_2$ (Fig. 2), derived mathematically in the Letters Patent previously referred to, are such that: first, the lens will have a specified refracting power; and second, an arc described at radius R from center O will pass through point C at the intersection of the refracting surfaces and also through point F which is the optical center of the lens. Values of $r_1$ and $r_2$ calculated in this manner determine a lens form which is bent to radius R around the point O lying on the optical axis outside of the lens. The lens may therefore be defined as having an optical symmetry with respect to point O and radius R. The values determining this symmetry are, $$r_1 = \frac{cfR[R(1+\cos\varphi) - \sqrt{2c^2f^2(1+\cos\varphi) - R^2(1-\cos^2\varphi)}]}{R^2 - c^2f^2}$$

$$r_2 = \frac{cfR[R(1+\cos\varphi) + \sqrt{2c^2f^2(1+\cos\varphi) - R^2(1-\cos^2\varphi)}]}{R^2 - c^2f^2}$$

wherein $f$ is the focal length of the lens
$c$ is (index of refraction of glass) $-1$
R is radius of bending of lens
$\varphi$ is angle between optical axis and extreme position of radius R. (Fig. 2)

for values of $\varphi$ less than 8 degrees, the following approximations are very nearly correct and, because of their simplicity, are convenient for preliminary calculations:

$$r_1 = \frac{2Rcf}{R+cf} \qquad r_2 = \frac{2Rcf}{R-cf}$$

The design of a single element lens, such as lens wheel element 3, is fully determined by the above calculations for values of $r_1$ and $r_2$, except for lens thickness which may have any value required by the mechanical structures without changing its optical symmetry with respect to point O and radius R.

The design of an achromatic component or complete achromatic objective involves the use of more than one kind of glass and at least two lens elements, hence the simple calculations for bending a single element lens no longer provide a complete solution. An excellent achromatic triplet, specifications for which are given hereinafter in a table, designed and built to operate as front component 4 in my revolving lens wheel projector, is an example of a multiple element objective having optical symmetry with respect to a point O and radius R and having further optical symmetry with respect to a point F (Fig. 3) on the optical axis and within the lens.

This triplet consists of a crown element cemented between two flint elements, the latter being both made of the same kind of glass. The crown element is bent with respect to point O and radius R as if it were surrounded by air. The interior surfaces of the flint elements conform to the curvatures of the adjacent crown surfaces so they may be cemented together. The exterior surfaces (radii $r_1'$ and $r_2'$) of the flint elements are calculated as if the flint elements were one piece and no crown element was imbedded therein. The ratio of refracting power of the positive crown element to the total refracting power of the negative flint elements is proportional to the V value of the glasses employed. The V value for visual rays of a glass is $$\frac{n_D - 1}{n_F - n_C}$$

wherein $n_D$, $n_F$, and $n_C$ represent respectively the index of refraction for the D, F and C lines. The proper relation between refractive powers and V values is required, of course, to render the objective achromatic. The algebraic sum of the refracting powers of the elements is the refracting power of the triplet. The calculations thus far have determined the curvatures of the surfaces. There remains only the determination of the proper thickness of elements to bring optical center F (Fig. 3) of crown element into exact register with optical center F of the combined flint elements.

The distances $a$ and $b$ from optical center F (Fig. 2) to the refracting surfaces of a double convex lens are proportional to the radii of curvature of the surfaces. Thus $$\frac{a}{b} = \frac{r_1}{r_2}$$

Employing this relationship and using $r_1$ and $r_2$ (Fig. 3), the distance $a$ is determined for the crown element. To this value $a$ is added the center thickness of the thinner flint element and the resulting value $a'$ together with $r_1'$ and $r_2'$ (Fig. 3), is used to calculate $b'$. The value $b$ for the crown element subtracted from the value $b'$ for the complete triplet gives the center thickness of the thicker flint element. Thus the thickness of each element has been determined and the exact position of the common optical center has been fixed. A triplet built to these dimensions is optically symmetrical both internally and externally with respect to point 0 and radius R and moreover, the crown element and the combined flint elements have a common optical center F.

Figure 3:
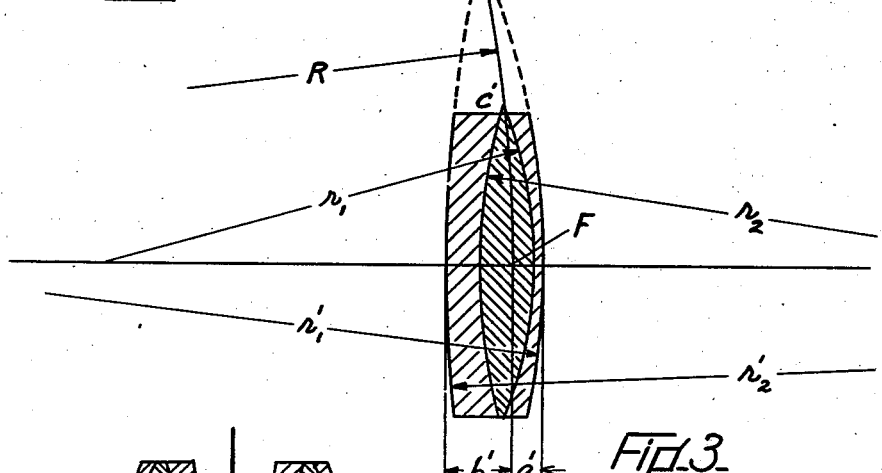
Fig. 3 is a cross section of a cemented triplet wherein the optical center of the central element coincides with the optical center of the exterior surfaces of the complete objective.

When the curvatures and thickness dimensions of the elements of such a triplet are drawn to scale, we have the conditions shown in Fig. 3 wherein an arc of radius R described around center 0 on the optical axis passes through F, the common optical center of the central crown element and of the combined flint elements, and also through the point of intersection C' of the crown refracting surfaces (extended) and through the point of intersection C'' of the exterior flint refracting surfaces (extended). Obviously, the spherical surfaces of the crown and flint elements in this triplet are related in a very unusual and unique way: a way wherein they would never have become related by accident or by any method of computation other than the method hereinbefore disclosed. There never has been heretofore, any design of lenses or any method of computation which would make one flint element (front) so thin and the other flint element (rear) so thick as is illustrated in Fig. 3 which is drawn to scale. The design procedure, as hereinbefore described, is straightforward and simple, consisting of two principal steps; first, calculation of the curvatures of the refracting surfaces and, second, calculation of the spacing of each refracting surface from the nodal point of the optical system. Any lens system calculated in this manner possesses the geometrical relationship of refracting surfaces, with respect to curvatures and spacings, which is peculiar to and characteristic of this design. The lens system thus designed is mathematically correct: for its type, there is no better combination of curvatures and spacings for the refracting surfaces. A lens system so designed will give optimum performance.

The mathematical conception of a single lens element bent to radius R around a point 0 on its optical axis may be stated as follows: The lens is so formed that its optical center F and the circle of intersection of its spherical refracting surfaces lie on the surface of an imaginary sphere of radius R centered on point 0. Furthermore, all points on the surface of this imaginary sphere, within the circle of intersection of the refracting surfaces of the lens, are distant from these spherical refracting surfaces in the ratio of $a/b$ or $r_1/r_2$. The foregoing is merely a statement of the geometrical relationship existing between the curvatures of the refracting surfaces due to the fact that the lens is bent to radius R about the point 0 as illustrated in Fig. 2 of the drawing.

The mathematical conception of the achromatic triplet, which is the basic disclosure of the present application, may be stated as follows: The triplet comprises a crown element so formed that its optical center F and the circle of intersection of its spherical refracting surfaces lie on the surface of an imaginary sphere having radius R centered on point 0, and two flint elements so formed and of such thicknesses that their joint optical center and the circles of intersection of their internal and external spherical refracting surfaces lie on the surface of the imaginary sphere having radius R centered on point 0. Furthermore, all points on the surface of this imaginary sphere within the circle of intersection of the refracting surfaces of the crown element are distant from these refracting surfaces in the ratio of $a/b$ or $r_1/r_2$, and all points on the surface of this imaginary sphere within the circle of intersection of the exterior refracting surfaces of the flint elements are distant from these refracting surfaces in the ratio of $a'/b'$ or $r_1'/r_2'$. The foregoing is a statement of the peculiar geometrical relationships existing between all refracting surfaces because of the bending of the lens and spacing of the surfaces as illustrated in Fig. 3 of the drawing. The ratio of refracting power of the crown element to the total refracting power of the flint elements is proportional to the V values of the crown and flint glasses.

It is to be noted that the triplet design, wherein a crown element of lower refracting power is cemented between flint elements of higher refracting power, possesses one highly important advantage over other forms of lenses wherein a crown element of low refracting power forms an exterior surface. When the glasses of higher refracting power form the glass-air surfaces, as in Fig. 3, the radii $r_1'$ and $r_2'$ are longer, for a given lens power, than they would be if a crown element formed a glass-air surface. Flatter exterior surfaces contribute to a reduction in spherical aberration and therein lies one important advantage of the present triplet design.

Tests on several triplets designed in the foregoing manner for widely varying applications have shown image quality heretofore unattainable. It is believed that the relatively simple conceptions herein disclosed comprise all the fundamental factors requiring consideration in the design of a highly corrected objective. The simple expedient of bending a triplet symmetrically with respect to a point on the optical axis exterior to the lens and proportioning the thicknesses of the elements to provide a common optical center, i. e., providing optical symmetry with respect to a point on the optical axis and within the lens, has eliminated entirely the laborious and tedious ray tracing method of design which often requires several man years of computing to arrive at an approximate specification for a high speed photographic objective.

Point 0, of course, always lies on the optical axis of the lens, but radius R may vary somewhat depending upon the function to be performed by the particular lens. For example, in the revolving lens wheel projector (Fig. 1) radius R for lens wheel elements 3, is the radius of the circle whereon the optical centers of the rectifying lens elements are located in the lens wheel assembly as more particularly described in Letters Patent No. 1,957,457. In the case of a telescope objective, which is used normally for viewing distant objects and is therefore focussed at or near infinity, it is advisable to make R equal to or slightly greater than the focal length. In the case of objectives operating at fixed focus R may be equal to the distance from the optical center of the lens to the plane of fixed focus. The designer selects the radius of bending to best suit the conditions whereunder the objective is to function.

A typical triplet for use as front component 4, in my revolving lens wheel optical rectifying objective, was built to the following specifications calculated as hereinbefore described:

| | Inches |
|---|---|
| Focal length | 9.92 |
| Diameter | 2.375 |
| Center thickness | .748 |
| R equals | 11.25 |

| Glass | $n_D$ | V |
|---|---|---|
| Crown | 1.5230 | 58 |
| Flint | 1.6228 | 36.1 |

| Dimension | Crown | Flint | Flint |
|---|---|---|---|
| $r_1$ | 3.346 | 3.346 | |
| $r_2$ | 4.724 | | 4.724 |
| $r_1'$ | | 6.043 | |
| $r_2'$ | | | 12.795 |
| Thickness | .410 | .070 | .268 |

All linear dimensions are in inches.

Figure 4:
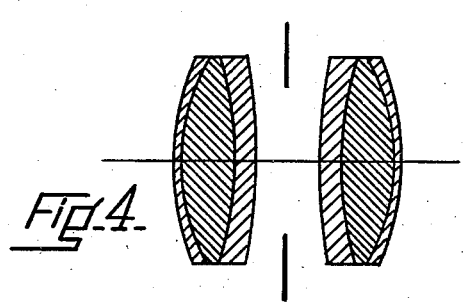
Fig. 4 is a cross section of a pair of cemented triplets with a diaphragm placed centrally between them for photographic use or for use in television cameras.

While I have described in detail a cemented triplet, it is obvious that many combinations of elements and varieties of glass may be used in designing and constructing a lens system which may possess, either in its entirety or in groups of its elements, the optical symmetry with respect to a radius R and a point 0 on the optical axis exterior to the system, and the optical symmetry with respect to a point F on the optical axis within the system, which is the basic disclosure of this application. A triplet, such as I have described, used alone makes a most satisfactory telescope objective or a long focus photographic objective. A pair of these triplets suitably spaced and provided with a centrally located diaphragm (Fig. 4) makes an excellent high speed distortion free photographic objective or an objective of excellent quality for the television camera. Innumerable other applications of these design features will occur to those skilled in the art of lens design. The appended claims are drawn to cover any and all lens systems wherein groups of elements and/or the entire system may possess the optical symmetry herein specified.

Having thus fully described my invention, what I claim is,

1. A triplet comprising a central crown element and a pair of flint elements, said crown element having the radii of curvature of its two refracting surfaces so related that said crown element meets the specification of being bent to radius R about a point 0 on the optical axis of said triplet, said pair of flint elements having the radii of curvature of its internal and external refracting surfaces so related that said pair of flint elements meets the specification of being bent also to said radius R about said point 0.

2. A triplet comprising a central crown element and a pair of flint elements, said crown element having the radii of curvature of its two refracting surfaces so related that said crown element meets the specification of being bent to radius R about a point 0 on the optical axis of said triplet, said pair of flint elements having the radii of curvature of its internal and external refracting surfaces so related that said pair of flint elements meets the specification of being bent also to said radius R about said point 0, the external refracting surfaces of said flint elements intersecting the optical axis of said triplet at points displaced from the nodal point of said crown element in proportion to the radius of curvature of each of said external refracting surfaces of said flint elements.

3. A triplet comprising a central crown element and a pair of flint elements, said crown element being so formed that its optical center F and the circle of intersection of its spherical refracting surfaces (extended) lie on the surface of an imaginary sphere having radius R centered on point 0, and said flint elements being so formed and of such thicknesses that their joint optical center and the circles of intersection of their internal and external spherical refracting surfaces (extended) lie on the surface of said imaginary sphere.

4. An optical rectifying objective comprising a plurality of identical lenses mounted on the periphery of a lens wheel, said identical lenses each having its principal focus at a common center on the axis of said lens wheel, the ratio of the radii of curvature of the refracting surfaces of each of said identical lenses determining a lens bent around said common center, and a multiple element stationary front component wherein the ratios of the radii of curvature of the refracting surfaces determine a front component bent to radius R, said radius R being equal to the focal length of each of said identical lenses mounted on the periphery of said lens wheel.

ARTHUR J. HOLMAN.